(12) United States Patent
Hall et al.

(10) Patent No.: US 6,889,702 B2
(45) Date of Patent: May 10, 2005

(54) REPLACEABLE VALVE SEAT RING WITH ENHANCED FLOW DESIGN

(75) Inventors: Randy J. Hall, Marshalltown, IA (US); Ronald C. Burr, Marshalltown, IA (US); Carl D. Miller, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 0 days.

(21) Appl. No.: 10/791,199

(22) Filed: Mar. 2, 2004

(65) Prior Publication Data

US 2004/0168721 A1 Sep. 2, 2004

Related U.S. Application Data

(63) Continuation of application No. 10/144,976, filed on May 14, 2002, now Pat. No. 6,698,449.
(60) Provisional application No. 60/335,994, filed on Nov. 15, 2001.

(51) Int. Cl.[7] .............................. F16K 1/42; F16K 43/00
(52) U.S. Cl. ................................ 137/315.41; 29/221.6; 137/15.17; 137/15.18; 137/327; 251/121; 251/122; 251/333; 251/360
(58) Field of Search ........................... 137/15.17, 15.18, 137/315.01, 315.41, 327, 328; 29/213.1, 221.6; 251/122, 333, 360, 363, 120, 121

(56) References Cited

U.S. PATENT DOCUMENTS

| | | | |
|---|---|---|---|
| 600,766 A | * 3/1898 | Barrett | 251/360 |
| 1,346,737 A | * 7/1920 | Atteberry | 251/86 |
| 1,506,546 A | * 8/1924 | Oleson | 251/360 |
| 1,517,380 A | * 12/1924 | Oleson | 251/360 |
| 1,544,219 A | * 6/1925 | Collar | 137/243.2 |
| 1,681,233 A | * 8/1928 | Ernest | 251/360 |
| 1,693,676 A | * 12/1928 | Spinelle | 251/360 |
| 1,708,241 A | 4/1929 | Schultheiss | |
| 1,763,486 A | * 6/1930 | Strong | 251/360 |
| 1,878,288 A | 9/1932 | Mohr | |
| 1,970,726 A | * 8/1934 | Barrett | 251/360 |
| 2,034,829 A | * 3/1936 | O'Malley | 251/360 |
| 2,104,419 A | 1/1938 | Frye | |
| 2,172,073 A | 9/1939 | Smith | |
| 2,735,444 A | 2/1956 | Mueller et al. | |
| 2,985,424 A | * 5/1961 | Anderson et al. | 251/360 |
| 3,362,680 A | * 1/1968 | Weiss | 251/360 |
| 3,724,813 A | * 4/1973 | Baumann | 251/360 |
| 3,755,876 A | * 9/1973 | Beasley | 29/213.1 |
| 3,901,475 A | 8/1975 | Dreibelbis | |
| 4,505,288 A | 3/1985 | Murphy, Jr. et al. | |
| 4,520,842 A | 6/1985 | Elliott | |
| 4,542,879 A | * 9/1985 | Stein | 251/360 |
| 4,573,489 A | 3/1986 | Carlton et al. | |
| 4,721,284 A | 1/1988 | Bankard | |
| 4,790,348 A | * 12/1988 | Gausman et al. | 251/360 |
| 4,928,726 A | * 5/1990 | Johnson et al. | 137/327 |
| 5,765,814 A | 6/1998 | Dvorak et al. | |
| 5,787,921 A | * 8/1998 | Kryger | 137/329.2 |
| 6,189,862 B1 | * 2/2001 | McKay | 251/363 |

FOREIGN PATENT DOCUMENTS

| | | |
|---|---|---|
| BE | 537256 | 3/1959 |
| CA | 448062 | 4/1948 |
| CZ | 320481 | 3/1957 |
| DE | 165235 | 2/1950 |
| DE | 1098311 | 1/1961 |
| GB | 232765 | 4/1925 |
| GB | 233850 | 5/1925 |

* cited by examiner

*Primary Examiner*—George L. Walton
(74) *Attorney, Agent, or Firm*—Marshall, Gerstein & Borun LLP

(57) ABSTRACT

A replaceable valve seat ring for a valve assembly has an annular ring body and an open flow passage extending through the ring body. A seating surface is provided on the ring body adjacent one end of the flow passage. A tool accepting region of the flow passage is formed concentric with and at least partially along the flow passage. The tool accepting region is adapted to receive a standard tool head therein for installing and removing the valve seat ring.

16 Claims, 3 Drawing Sheets

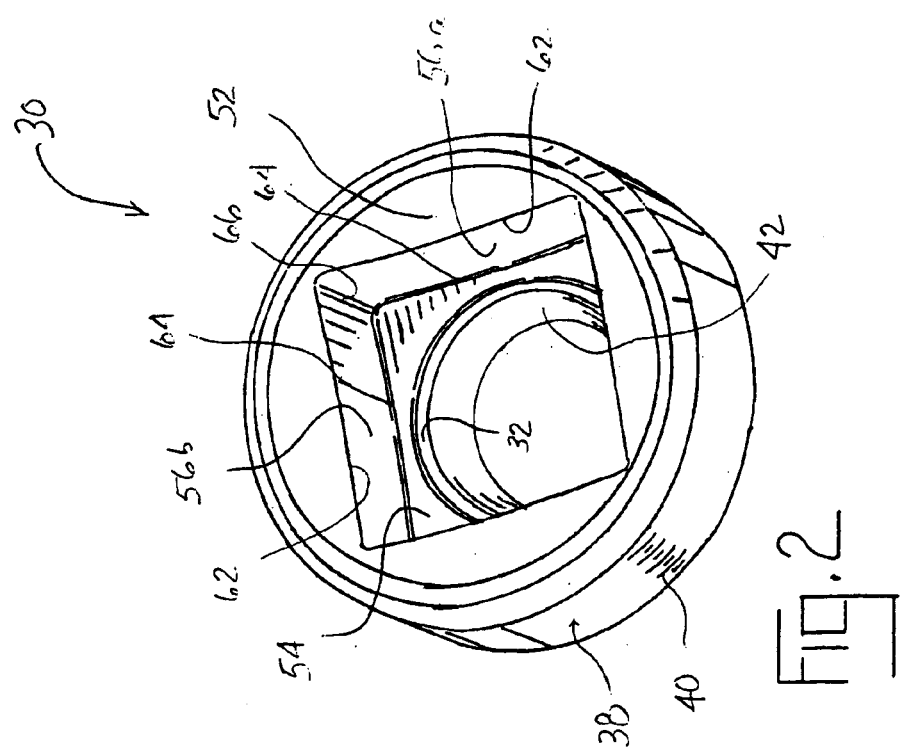
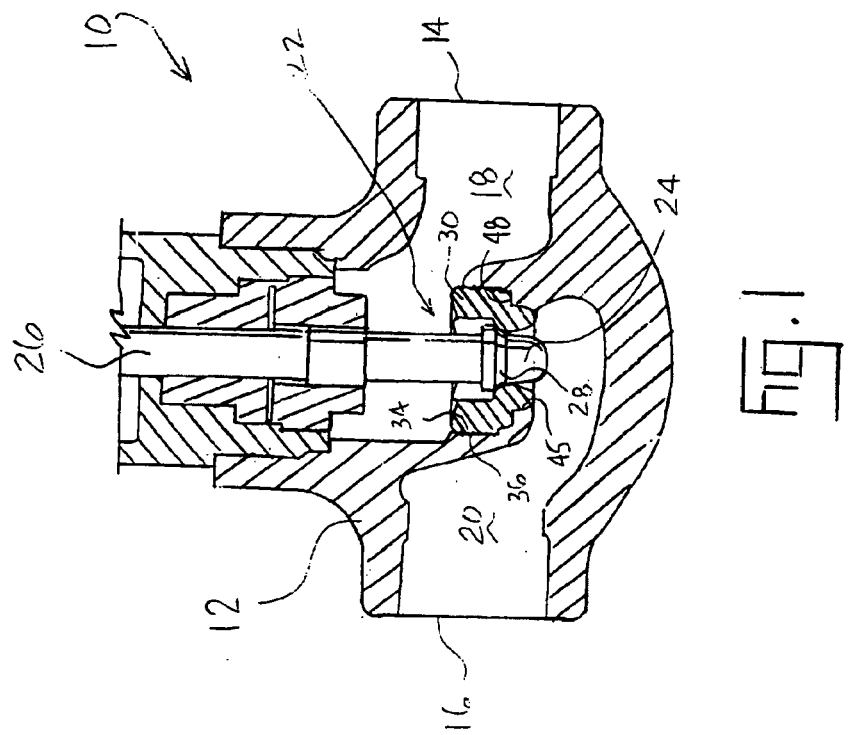
Fig. 2
Fig. 1

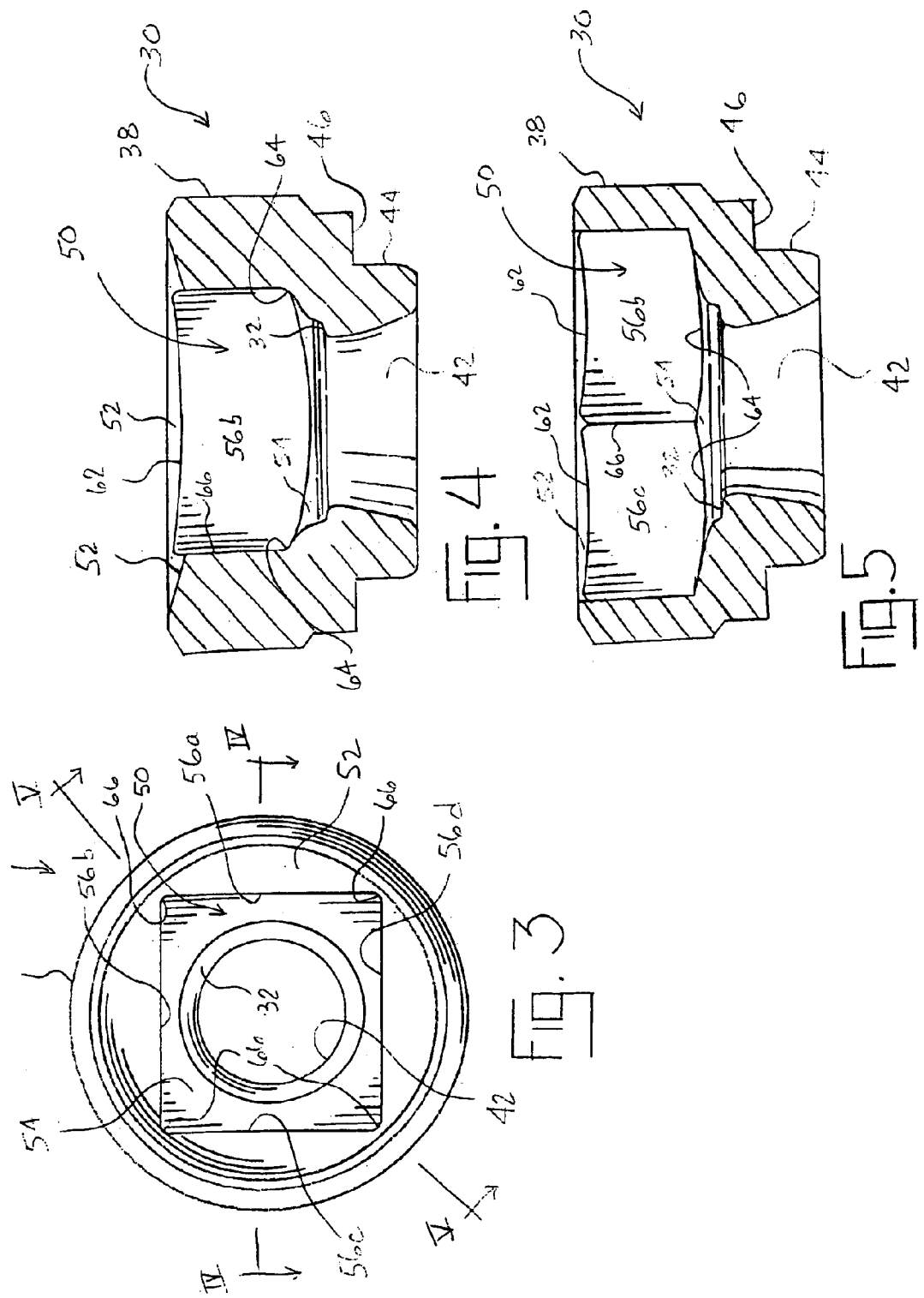

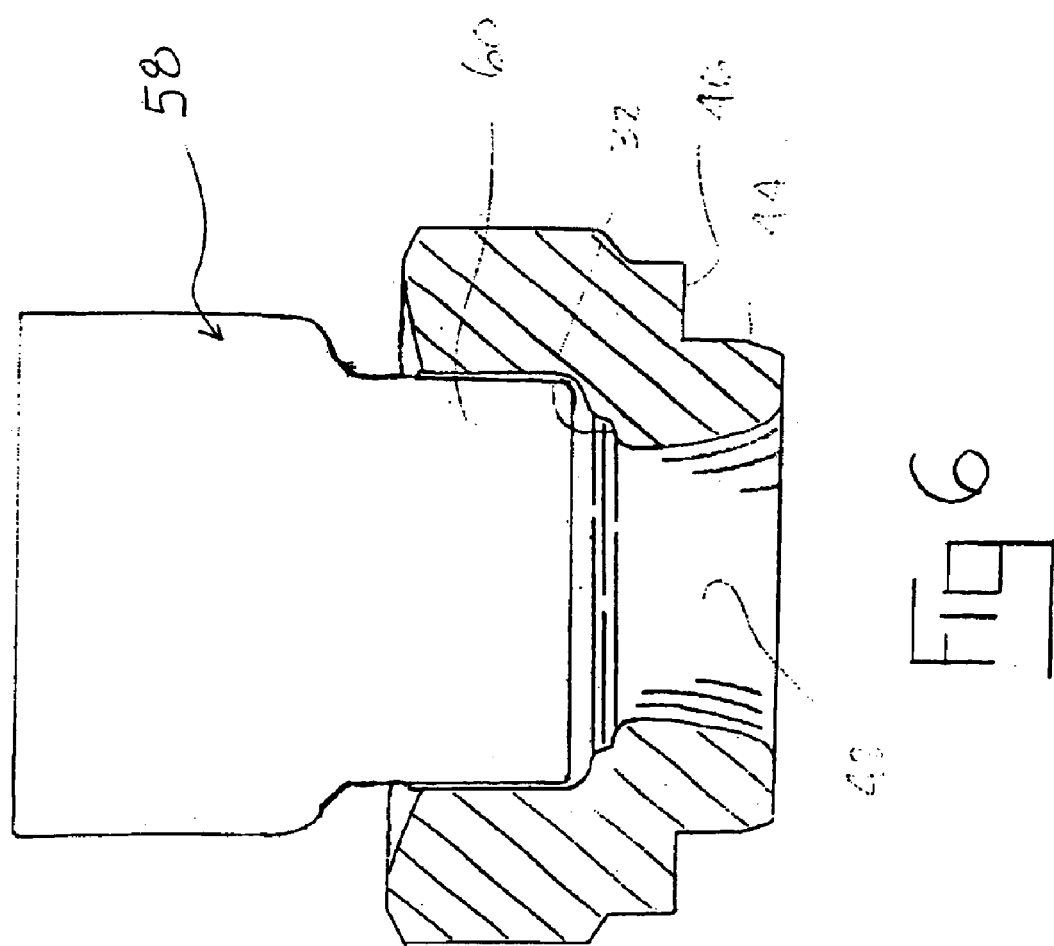

REPLACEABLE VALVE SEAT RING WITH ENHANCED FLOW DESIGN

RELATED APPLICATION DATA

This patent is a continuation of application Ser. No. 10/144,976, filed May 14, 2002, now U.S Pat. 6,698,449 and is related to co-pending U.S. Provisional Patent Application Ser. No. 60/335,994, which was filed on Nov. 15, 2001.

FIELD OF THE INVENTION

The present invention generally relates to valves, and more particularly to a replaceable valve seat ring for fluid flow valves.

BACKGROUND OF THE INVENTION

Fluid valves are used in a wide range of fluid process and control system applications for controlling various flow parameters of a process fluid. A wide variety of valve types are known and can include, for example, dump valves, control valves, throttling valves, and the like. Similarly, fluid process and control systems are utilized for handling a myriad of different fluid media.

A typical valve has a fluid inlet coupled through a flow control or orifice region to a fluid outlet. A closure device of some kind is typically provided in the flow control region with a portion that is movable to control fluid flow from the valve inlet to the valve outlet. The movable portion is often a valve plug that can be moved to bear against a corresponding fixed seating surface of the closure device to selectively shut off flow of fluid through the valve. During continued use of such a valve, the seating surface of the closure device inevitably becomes worn or damaged. Inadequate flow shut off of the closure device will result, causing poor performance or failure of the valve. Thus, the valve seating surface must eventually be repaired or replaced, or the entire valve must be replaced to again achieve proper function of the valve.

In one known example, a valve seat ring has a seating surface and is disposed within a flow control or orifice region of the valve. The seat ring is removable in order to replace the seat ring or to repair the seating surface. This type of removable seat ring has a hex-shaped head extending upward from a top surface of the ring. The hex head is adapted to accept a particular standard size hex socket or wrench for installing or removing the ring. However, the upwardly protruding hex head negatively interferes with fluid flow through the orifice region of the valve, and the technician must have the particular tool size on hand.

In another known example, a pair of small blind bores formed into the top surface of the seat ring. These bores are adapted to receive two spaced apart prongs of a specialized tool to install or remove the ring. The technician must have access to this specialized tool at all times in order to service this type of valve.

BRIEF DESCRIPTION OF THE DRAWINGS

Objects, features, and advantages of the present invention will become apparent upon reading the following description in conjunction with the drawing figures, in which:

FIG. 1 is a cross sectional view of one example of a dump valve having a replaceable valve seat ring constructed in accordance with the teachings of the present invention.

FIG. 2 is a perspective view of the seat ring of the dump valve shown in FIG. 1

FIG. 3 is a top view of the seat ring shown in FIG. 2.

FIG. 4 is a side cross sectional view taken along line IV—IV of the seat ring shown in FIG. 3.

FIG. 5 is a side cross sectional view taken along line V—V of the seat ring shown in FIG. 3.

FIG. 6 is a side cross sectional view of the seat ring as shown in FIG. 4 and having a standard extension of a socket wrench installed in the seat ring for installation or removal from the dump valve shown in FIG. 1.

DETAILED DESCRIPTION OF THE PREFERRED EMBODIMENTS

A valve seat ring for a fluid valve or the like is disclosed herein that is easily installed, removed, and replaced utilizing conventional hand tools. The disclosed valve seat ring is suitable for many different types of valves. The example set forth herein is described with reference to what is known as a sliding stem type "dump" valve construction. However, the disclosed seat ring is equally well suited for many other types and constructions of valves, such as, for example, control valves, throttling valves, or the like. The present disclosure is not to be limited to any particular type of valve.

The disclosed seat ring includes a region for accepting a standard size and shape socket wrench extension. The standard socket wrench can be utilized to remove and install a seat ring in the valve as desired. The valve seat ring also provides smooth flow characteristics in conjunction with the tool accepting region.

Referring now to the drawings, FIG. 1 shows one example in cross section of a sliding stem type dump valve 10 constructed in accordance with the teachings of the present invention. The dump valve 10 has a valve body 12 with a fluid inlet 14 at one end and a fluid outlet 16 at an opposite end. The fluid inlet is in communication with an inlet passageway 18 and the fluid outlet is in communication with an outlet passageway 20. Each of the inlet and outlet passageways 18 and 20, respectively, meet generally within the valve body 12 and are in communication with one another through an orifice region 22.

The valve 10 has a valve plug 24 coupled to a valve stem 26 at one end. The valve stem 26 is coupled at its opposite end to an actuator (not shown) that can move the valve stem and plug along a longitudinal axis of the stem.

The valve plug 24 has a seating surface 28 which comes in contact with and bears against a valve seat ring 30 when in a valve closed position. The valve seat ring 30 is installed in the orifice region 22 as is described in greater detail below. During operation of the dump valve 10, the actuator (not shown) moves the valve stem 26 and valve plug 24 toward and away from a seating surface 32 of the seat ring 30 to close and open, respectively, the dump valve to permit fluid flow from the inlet 14 to the outlet 16 through the passageways.

In accordance with the teachings of the present invention, the seat ring 30 disclosed in FIG. 1 is removably installed within the orifice region 22 of the valve body 12. The orifice region 22 has a bore 34 extending between the inlet passageway 18 and the outlet passageway 20. The bore 34 has female mechanical threads 36 formed axially along and circumferentially around at least a portion of the bore.

As shown in FIGS. 2–5, the seat ring 30 has a circular cylindrical perimeter or circumferential surface 38 with male threads 40 that correspond to the female threads 36 of the bore 34. As shown in FIG. 1, the seat ring 30 as installed is threaded into the bore 34. By rotating the seat ring 30 in one direction relative to the bore 34, the ring can be installed in the orifice region 22. By rotating the seat ring in the opposite direction relative to the bore 34, the seat ring 30 can be removed and replaced.

As shown in FIGS. 2 and 3, the seat ring 30 defines a flow orifice 42 through the orifice region 22 when installed. Fluid passes through the orifice 42 of the seat ring 30 when the valve plug 24 is in the valve open position spaced from the seating surface 32 of the ring 30. The disclosed flow orifice 42 of the ring 30 is a circular orifice, although the shape of the orifice can vary according to the needs of a particular valve design and to achieve desired flow characteristics. An inlet end of the orifice 42 corresponds with the seating surface 32 of the ring 30.

Further details of the disclosed seat ring 30 constructed in accordance with the teachings of the present invention are described with reference to FIGS. 3–5. The larger diameter portion of the perimeter surface 38 of the seat ring 30, including the male mechanical threads 40, is formed as a circular cylinder. The seat ring 30 also has a smaller diameter, necked-down end 44 adjacent the outlet end of the orifice 42. The necked-down end 44 is received in a corresponding smaller diameter portion 45 of the bore 34 when installed. The purpose of the necked-down end 44 is to properly position the seat ring 30 in the orifice region 22 and to align the seat ring with the smaller diameter portion 45 of the bore 34. An annular shoulder surface 46 extends between and connects the necked-down end 44 and the perimeter threaded surface 38 of the ring. When installed as shown in FIG. 1, the shoulder surface 46 of the ring 30 bottoms against a corresponding ledge or stop surface 48 within the bore 34. The shoulder surface seats against the ledge surface to precisely position the installed seat ring 30 in the bore 34 of the valve body 12.

Though mechanical threads are disclosed herein as a mechanical engaging device for installing the valve seat, other mechanical means for securing the valve seat in place can also be utilized. For example, a key and way system can also be used where the seat and a part of the orifice region engage with one another by a twist-and-lock motion. Other alternative constructions are also certainly within the spirit and scope of the invention.

As best illustrated in FIGS. 4 and 5, the flow orifice 42 in this example extends only part way through the thickness or height of the ring 30. The inlet end of the orifice 42 opens into and communicates with a larger sized tool receptacle or recess 50. The tool recess 50 is formed into a top surface 52 of the ring to a desired depth. The tool recess 50 in this example terminates at an intermediate surface 54 within the body of the ring 30. The intermediate surface generally lies in the plane of the inlet end of the flow orifice 42. The seating surface 32 is formed as a recessed annular surface in the intermediate surface and surrounds the inlet end of the flow In the disclosed example, the tool recess or accepting region 50 is an essentially square opening having four sides 56a, 56b, 56c, and 56d. The four sides are generally vertically oriented, although the sides can be slightly tapered at a draft angle for casting or forming purposes. As shown in FIGS. 2 and 3, the sides are arranged as a square opening that forms part of the flow passage and has two pairs of opposed, parallel, flat sides 56a, 56c and 56b, 56d. Adjacent ones of the sides 56a–56d are interconnected at rounded corners 60, as described further below. In this example, the four sides 56a–56d and the intermediate surface 54 together define the tool recess 50 having a shape that corresponds to a standard socket wrench extension. In one example, a standard three-quarter inch socket extension can be inserted directly into the tool recess for removing or installing the seat ring 30 (see FIG. 6 and the description below). In other examples, the tool recess 50 can be configured to accommodate different sized socket extensions such as a standard half-inch or three-eighths inch extension size. In still other examples, the tool recess 50 can be configured to accommodate a different standard configuration tool head other than a socket extension, such as a TQRX head, ALLEN wrench, hex head, or other standard configuration.

Because the disclosed seat ring 30 requires only a standard socket extension, the seat ring eliminates the need for purchasing, maintaining, and storing a special tool or a particular sized tool for installing or removing the ring. Instead, only a standard socket extension, common to nearly every technician's tool box, is sufficient for installation and removal of the valve seat ring. FIG. 6 illustrates a standard socket extension 58 including an extension head 60 received in the tool recess 50 of the seat ring 30.

Aside from the improved installation and removal aspects of the valve seat ring 30, the ring also provides substantially improved, smooth fluid flow characteristics. For example, the tool recess 50 only extends part way into the valve seat ring 30 and includes no part or element that protrudes upward from the ring top surface or inward into the flow orifice 42. This seat ring design is thus a substantial improvement over many prior designs which have a protruding feature adapted for accepting a particular tool configuration, as described above.

The disclosed seat ring 30 provides improved, smooth fluid flow characteristics for additional reasons as well. As shown in FIGS. 4 and 5, the flow orifice 42 is tapered slightly radially outward moving from the inlet end to the outlet end. The radial outward taper of the orifice 42 can achieve certain flow characteristics through the orifice and can be varied, eliminated, or otherwise altered in order to achieve particular desired flow characteristics. Other alternative flow orifice size, and shape configurations are also within the scope and spirit of the present invention. As one example, the separate and discrete flow orifice 42 can be eliminated and the tool recess 50 can extend the entire depth of the seat ring 30 and act as a full length flow orifice. However, in such an example, the valve plug and tool recess must be configured so as to ensure proper seating of the plug to the valve seat to achieve flow shut off. The contours of the tool recess in such an example can be suitably smooth and gradual so as not to severely affect flow characteristics through the recess.

In the disclosed example, as best illustrated in FIGS. 4 and 5, the top surface 52 of the seat ring 30 is tapered slightly downward moving from near the perimeter surface 38 toward the sides 56a–56d of the tool recess 50. The top surface transitions to the side surfaces 56a–56d of the recess at smooth, rounded edges or surfaces 62. The side surfaces 56a–56d again smoothly transition at smooth, rounded interior bottom corners 64 into the intermediate surface 54. The sides 56a–56d also transition laterally into one another at smooth, rounded corners 66. The intermediate surface 54 is also angled or tapered slightly downward moving from the tool recess sides 56a–56d toward the seating surface 32 at the inlet end of the flow orifice 42. The intermediate surface 54 and the seating surface 32 smoothly transition into the flow orifice 42. The wall of the orifice 42, as described above, also tapers radially outward moving toward the necked-down end 44 of the seat ring 30. All of these smooth and slightly tapered surfaces and smooth corners provide smooth flow paths for fluid passing through the orifice region 22 of the valve 10. The smooth flow surfaces prevent formation of unstable or turbulent pockets of fluid that can detrimentally affect flow characteristics and performance of the valve.

The replaceable valve seat ring 30 as disclosed herein permits use of a standard socket wrench or other such standard tool for installation and removal of the seat ring from a valve 10 for repair or replacement when damage to the ring has occurred. In addition, the disclosed seat ring produces much improved fluid flow characteristics both over and through the seat ring as compared to prior known replaceable valve seat designs. As will be evident to those having ordinary skill in the art and as noted above, the tool recess 50 can vary from that disclosed. As a further example, the recess can be a six-sided recess for accepting a tool such as an ALLEN wrench and yet perform adequately as disclosed herein. Other variations to the seat ring are also possible. Although the seat ring disclosed herein can be fabricated from numerous different materials, one preferred material is a sufficiently hard and exceptionally durable material known as Alloy 6.

Although certain replaceable valve seat rings have been disclosed and described herein in accordance with the teachings of the present invention, the scope of coverage of this patent is not limited thereto. On the contrary, this patent covers all embodiments of the teachings of the invention that fairly fall within the scope of permissible equivalents.

What is claimed is:

1. A replaceable valve seat ring comprising:
   an annular ring body having a perimeter;
   an open flow passage extending through the ring body;
   a circular seating surface on the ring body positioned along the flow passage;
   a square, smooth walled, cylinder shaped tool accepting region formed concentric within and at least partially along the flow passage, the tool accepting region having a tapered top surface that smoothly transitions inward from the perimeter to the walls of the tool accepting region, and having smooth rounded corners interconnecting adjacent walls of the tool accepting region, the tool accepting region adapted to receive a standard, square tool head socket extension therein for installing and removing the valve seat ring; and
   an intermediate surface that smoothly and gradually transitions between the square cylinder tool accepting region and the circular seating surface and defines an inlet to a flow orifice.

2. A replaceable valve seat ring according to claim 1, wherein the flow orifice is arranged in series and concentric with the tool accepting region along at least a portion of the flow passage.

3. A replaceable valve seat ring according to claim 2, wherein the flow orifice is contoured and sized differently than the tool accepting region to provide desired flow characteristics and is arranged downstream of the tool accepting region.

4. A replaceable valve seat ring according to claim 2, wherein transition surfaces extending between the flow orifice and the tool accepting region are substantially smooth and gradual to enhance flow efficiency and dynamics.

5. A replaceable valve seat ring according to claim 1, wherein the tool accepting region extends over a substantial portion of a length of the flow passage.

6. A replaceable valve seat ring according to claim 1, wherein the ring body has an exterior perimeter surface and a mechanical engaging feature provided on at least a part of the exterior perimeter surface, the mechanical engaging feature adapted to releasably engage with a complimentary portion of a valve assembly.

7. A replaceable valve seat ring according to claim 6, wherein the exterior perimeter surface is a circular cylinder and wherein the mechanical engaging feature comprises a plurality of mechanical threads.

8. A replaceable valve seat ring according to claim 1, further comprising an exterior circular cylinder perimeter surface with a first portion having a first diameter and a necked-down seating portion with a second diameter that is smaller than the first diameter for aligning the valve seat ring when installed in a valve.

9. A valve assembly comprising:
   a valve body;
   a fluid passageway extending through the valve body and having a fluid inlet and a fluid outlet;
   an orifice region defined within the fluid passageway;
   a valve plug disposed within the passageway; and
   a replaceable annular valve seat ring positioned in the orifice region, wherein the valve seat ring and the valve plug are movable relative to one another to selectively open or close the flow passage, wherein the valve seat ring has a perimeter, an open flow passage extending therethrough, a circular seating surface positioned along the flow passage, a square, walled cylinder shaped tool accepting region formed concentric within and at least partially along the flow passage, the tool accepting region being part of the flow passage and having a tapered top surface that smoothly transitions inward from the perimeter to the walls of the tool accepting region, and having smooth rounded corners between adjacent walls of the tool accepting region, the tool accepting region adapted to receive a standard, square tool head socket extension therein for installing and removing the valve seat ring; and
   an intermediate surface that smoothly and gradually transitions between the square cylinder tool accepting region and the circular seating surface and that defines an inlet to a flow orifice.

10. A valve assembly according to claim 9 wherein the valve seat ring is installed in a fixed position within the orifice region and wherein the valve plug is selectively movable into and out of contact with the seating surface of the valve seat ring.

11. A valve assembly according to claim 9 wherein the valve seat ring has an exterior perimeter surface and a mechanical engaging feature provided on at least a part of the exterior perimeter, and wherein a portion of the orifice region includes a complimentary mechanical feature adapted to releasably engage with the mechanical engaging feature of the valve seat ring surface for securing and aligning the valve seat ring within the orifice region.

12. A valve assembly according to claim 11, wherein the mechanical engaging feature and the complimentary mechanical feature each comprise either male or female mechanical threads.

13. A valve assembly according to claim 9, wherein the valve seat ring has an exterior circular cylinder perimeter surface with a first portion having a first diameter and a necked-down seating portion with a second diameter that is smaller than the first diameter, and wherein the orifice region has a complimentary stepped surface.

14. A valve assembly according to claim 9, wherein the flow orifice is arranged in series and concentric with the tool accepting region along at least a portion of the flow passage, and wherein the flow orifice is contoured and sized differently than the tool accepting region to provide desired flow characteristics.

15. A method of installing a valve seat within a valve assembly, the method comprising the steps of:

choosing an appropriate valve seat having an annular ring body with a perimeter, an open flow passage extending through the ring body, a circular seating surface positioned alone the flow passage, and a square, smoothed walled cylinder shaped tool accepting region of the flow passage formed concentric with and at least partially along the flow passage, the tool accepting region having a tapered top surface that smoothly transitions inward from the perimeter to the walls of the tool accepting region. and having smooth rounded corners between adjacent walls, and an intermediate surface that smoothly and gradually transitions between the square cylinder tool accepting region and the circular seating surface and that defines an inlet to a flow orifice;

placing the chosen valve seat into a flow orifice of a valve body of the valve assembly;

selecting a tool socket wrench with a standard square tool head socket extension that fits within the tool accepting region;

inserting the standard square four-sided tool head socket extension into the tool accepting region of the valve seat;

and manipulating the tool socket wrench to install the valve seat into the orifice region.

16. A method of installing a valve seat according to claim 15, further comprising:

repeating the steps of selecting, inserting, and manipulating in order to remove the valve seat from the valve assembly.

* * * * *

UNITED STATES PATENT AND TRADEMARK OFFICE
CERTIFICATE OF CORRECTION

PATENT NO. : 6,889,702 B2
DATED : May 10, 2005
INVENTOR(S) : Randy J. Hall et al.

It is certified that error appears in the above-identified patent and that said Letters Patent is hereby corrected as shown below:

Column 4,
Line 10, please delete "TQRX" and replace it with -- TORX --.

Column 6,
Line 28, please delete "square, walled" and insert -- square, smooth walled --.

Column 7,
Line 9, please delete "alone" and insert -- along --.

Signed and Sealed this

Thirteenth Day of September, 2005

JON W. DUDAS
*Director of the United States Patent and Trademark Office*